US010836468B2

(12) United States Patent
Guering et al.

(10) Patent No.: US 10,836,468 B2
(45) Date of Patent: Nov. 17, 2020

(54) AIRCRAFT COCKPIT SIDE CONSOLE WITH ARTICULATED SINGLE-PIECE COMPONENTS

(71) Applicant: Airbus Operations S.A.S., Toulouse (FR)

(72) Inventors: Bernard Guering, Montrabe (FR); Matthieu De Kergommeaux, Toulouse (FR)

(73) Assignee: Airbus Operations S.A.S. (FR)

( * ) Notice: Subject to any disclaimer, the term of this patent is extended or adjusted under 35 U.S.C. 154(b) by 585 days.

(21) Appl. No.: 15/489,963

(22) Filed: Apr. 18, 2017

(65) Prior Publication Data

US 2017/0305531 A1 Oct. 26, 2017

(30) Foreign Application Priority Data

Apr. 26, 2016 (FR) ..................... 16 53670

(51) Int. Cl.
*B64D 1/00* (2006.01)
*B64C 13/04* (2006.01)
*B64D 11/00* (2006.01)
*B64F 5/10* (2017.01)
*B64C 25/34* (2006.01)
*B64D 47/00* (2006.01)

(52) U.S. Cl.
CPC .......... *B64C 13/0421* (2018.01); *B64C 13/04* (2013.01); *B64C 13/0423* (2018.01); *B64C 25/34* (2013.01); *B64D 11/00* (2013.01); *B64D 47/00* (2013.01); *B64F 5/10* (2017.01); *B64D 2231/025* (2013.01)

(58) Field of Classification Search
CPC .......... B64D 1/00; B64D 11/00; B64D 47/00
See application file for complete search history.

(56) References Cited

U.S. PATENT DOCUMENTS

| 5,996,954 | A | * | 12/1999 | Rosen | ................. | B60R 11/0235 |
| | | | | | | 248/278.1 |
| 6,152,400 | A | | 11/2000 | Sankrithi et al. | | |
| 2010/0140397 | A1 | | 6/2010 | Van Wassenhove et al. | | |
| 2011/0101058 | A1 | * | 5/2011 | Heckman | ............... | B64D 45/00 |
| | | | | | | 224/401 |
| 2012/0205491 | A1 | * | 8/2012 | Rittner | .................... | A62B 7/14 |
| | | | | | | 244/118.5 |
| 2017/0140666 | A1 | * | 5/2017 | Kennair, Jr. | ........... | F16M 13/04 |

FOREIGN PATENT DOCUMENTS

| EP | 2930110 A1 | 10/2015 |
| FR | 2900634 A1 | 11/2007 |
| FR | 2980456 A1 | 3/2013 |

OTHER PUBLICATIONS

FR 1653670—Search Report—dated Oct. 27, 2016.

* cited by examiner

*Primary Examiner* — J. Woodrow Eldred
(74) *Attorney, Agent, or Firm* — Lerner, David, Littenberg, Krumholz & Mentllik, LLP

(57) ABSTRACT

A side console for an aircraft cockpit includes a structure for mounting of an item of aircraft equipment and a complementary structure. The mounting structure and the complementary structure are formed of single-piece components articulated about an axis of articulation between a storage position in which the single-piece components are more or less folded against one another, and a position of installation in which the single-piece components extend respectively in substantially mutually perpendicular planes.

8 Claims, 5 Drawing Sheets

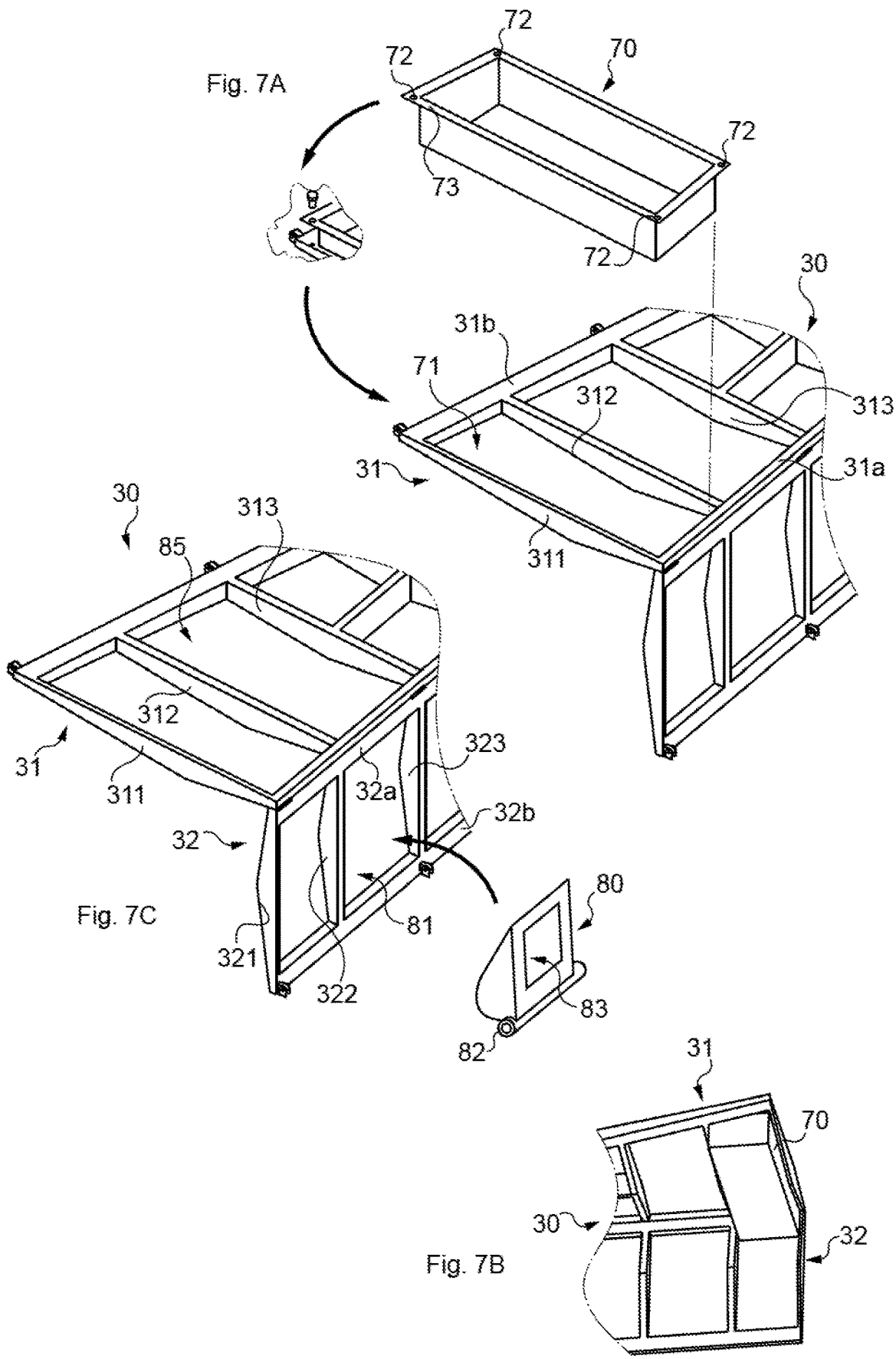

AIRCRAFT COCKPIT SIDE CONSOLE WITH ARTICULATED SINGLE-PIECE COMPONENTS

FIELD OF THE INVENTION

The present invention relates to a side console for an aircraft cockpit and to an aircraft cockpit comprising such a side console extending along a fuselage lateral wall of the nose of the aircraft.

In general, the invention relates to the installation of equipment and storage in an aircraft cockpit.

BACKGROUND OF THE INVENTION

It is known practice for an aircraft cockpit to be fitted with two side consoles positioned respectively to the left and to the right of the pilot and co-pilot.

Each side console, also known as a side former, extends along a fuselage lateral wall of the nose of the aircraft.

Such a side console allows the pilot or co-pilot to be offered a certain number of items of equipment and/or stowage or storage spaces in which to put or store various items.

Given the various constraints such as accessibility, mechanical stress loadings, a side console generally comprises numerous components making it possible both to form a primary structure or chassis, notably for the mounting of an item of aircraft equipment, and to form one or more secondary structures, making it possible to form storage or stowage spaces.

An item of aircraft equipment may by way of nonlimiting example be a flight control or an oxygen mask.

A side console thus requires numerous components to be attached to the floor of the cockpit, generally using rigid connections of the insetting type.

Because of the numerous fixing points, installing a side console in the cockpit is a lengthy and tricky undertaking.

BRIEF SUMMARY OF THE INVENTION

An aspect of the present invention proposes a side console of novel design that makes it possible to reduce the time taken to install it in an aircraft cockpit.

A first aspect of the present invention relates to a side console for aircraft cockpit comprising a structure for mounting of at least one item of aircraft equipment.

The said mounting structure is formed of a first single-piece component and of a second single-piece component which are articulated relative to one another about a common axis of articulation, between a storage position in which the said first and second single-piece components are more or less folded against one another, and an installation position in which the said first and second single-piece components extend respectively in two substantially mutually perpendicular planes.

Articulating the first and second single-piece components means that these can be introduced into the cockpit at the end of assembly, in their storage position folded against one another, and unfolded into a position of installation in the aircraft cockpit. Creating the mounting structure from two single-piece components makes it possible to limit the number of components in the side console and simplify its installation in the aircraft cockpit, thus reducing the installation time.

According to other possible features, considered in isolation or in combination with one another:

- each first and second single-piece component comprises a first edge extending along the common axis of articulation of the mounting structure and a second edge, opposite to the said first edge of each first and second single-piece component, the second edge comprising means of attachment by articulated connection;
- the first single-piece component comprises rigid ribs forming a frame for support of at least one item of aircraft equipment, such as an aircraft flight control chosen from a ministick designed to control the rolling of the aircraft and a device for steering an aircraft nosewheel;
- the side console comprises a complementary structure formed of a third single-piece component and of a fourth single-piece component which are articulated with respect to one another about a common axis of articulation of the complementary structure, between a storage position in which the third and fourth single-piece components are more or less folded against one another and an installation position in which the third and fourth single-piece components extend respectively in two substantially mutually perpendicular planes;
- each third and fourth single-piece component comprises a first edge extending along the common axis of articulation of the complementary structure and a second edge, opposite to the first edge of each third and fourth single-piece component, the second edge comprising means of attachment by articulated connection;
- the third and fourth single-piece components comprise rigid ribs defining various housings for the storage of objects chosen notably from an oxygen mask, smoke goggles, fire-resistant gloves or a lamp;
- in the said installation position, the mounting structure and the complementary structure extend in the continuation of one another in a longitudinal direction substantially parallel to the said common axis of articulation of the mounting structure and to the said common axis of articulation of the complementary structure.

According to a second aspect, the present invention also relates to an aircraft cockpit comprising at least one side console extending along a fuselage lateral wall of the nose of the aircraft, the side console comprising a structure for mounting of at least one item of aircraft equipment.

The mounting structure is formed of a first single-piece component and of a second single-piece component which are articulated relative to one another about a common axis of articulation, the said first and second single-piece components extending respectively in two substantially mutually perpendicular planes in a position of installation along the fuselage lateral wall.

Such an aircraft cockpit offers features and advantages similar to those described hereinabove.

According to other possible features, considered in isolation or in combination with one another:

- the first single-piece component comprises means of attachment by articulated connection to a frame of the fuselage lateral wall of the said aircraft, and the second single-piece component comprises means of attachment by articulated connection to the floor of the said cockpit;
- the first single-piece component comprises rigid ribs forming a frame for support of at least one item of aircraft equipment, such as an aircraft flight control chosen from a ministick designed to control the rolling of the aircraft and a device for steering an aircraft nosewheel;

the mounting structure defines, with the lateral wall of the fuselage and a floor of the cockpit, a free volume suited to the routing of an electrical circuit for powering and/or controlling the said at least one item of aircraft equipment and/or to the routing of a pipe carrying air or oxygen;

the side console comprises a complementary structure formed of a third single-piece component and of a fourth single-piece component which are articulated with respect to one another about a common axis of articulation of said complementary structure, the third and fourth single-piece components extending respectively in two substantially mutually perpendicular planes in an installation position along the lateral wall of the fuselage;

the third single-piece component comprises means of attachment by articulated connection to a frame of the fuselage lateral wall of the said aircraft, and the fourth single-piece component comprises means of attachment by articulated connection to the cockpit floor;

the mounting structure and the complementary structure extend in the continuation of one another in the longitudinal direction of the nose of the aircraft;

the third and fourth single-piece components comprise rigid ribs defining various housings for the storage of objects chosen notably from an oxygen mask, smoke goggles, fire-resistant gloves or a lamp;

the complementary structure defines, with the lateral wall of the fuselage and a floor of the cockpit, a free volume suited to the routing of an electrical circuit for powering and/or controlling the said at least one item of equipment of the mounting structure and/or to the routing of a pipe carrying air or oxygen.

Other specifics and advantages of the invention will become further apparent from the description hereinafter.

BRIEF DESCRIPTION OF THE DRAWINGS

In the attached drawings, which are given by way of nonlimiting examples:

FIG. 7A is a partial perspective view of the side console of FIG. 6, illustrating in exploded view the mounting of a first storage element according to one embodiment;

FIG. 7B is a partial schematic perspective view of the first storage element of FIG. 7A, mounted in the side console; and FIG. 7C is a partial perspective view of the side console of FIG. 6, illustrating in exploded view the mounting of a second storage element according to one embodiment.

DETAILED DESCRIPTION

Figure 1:
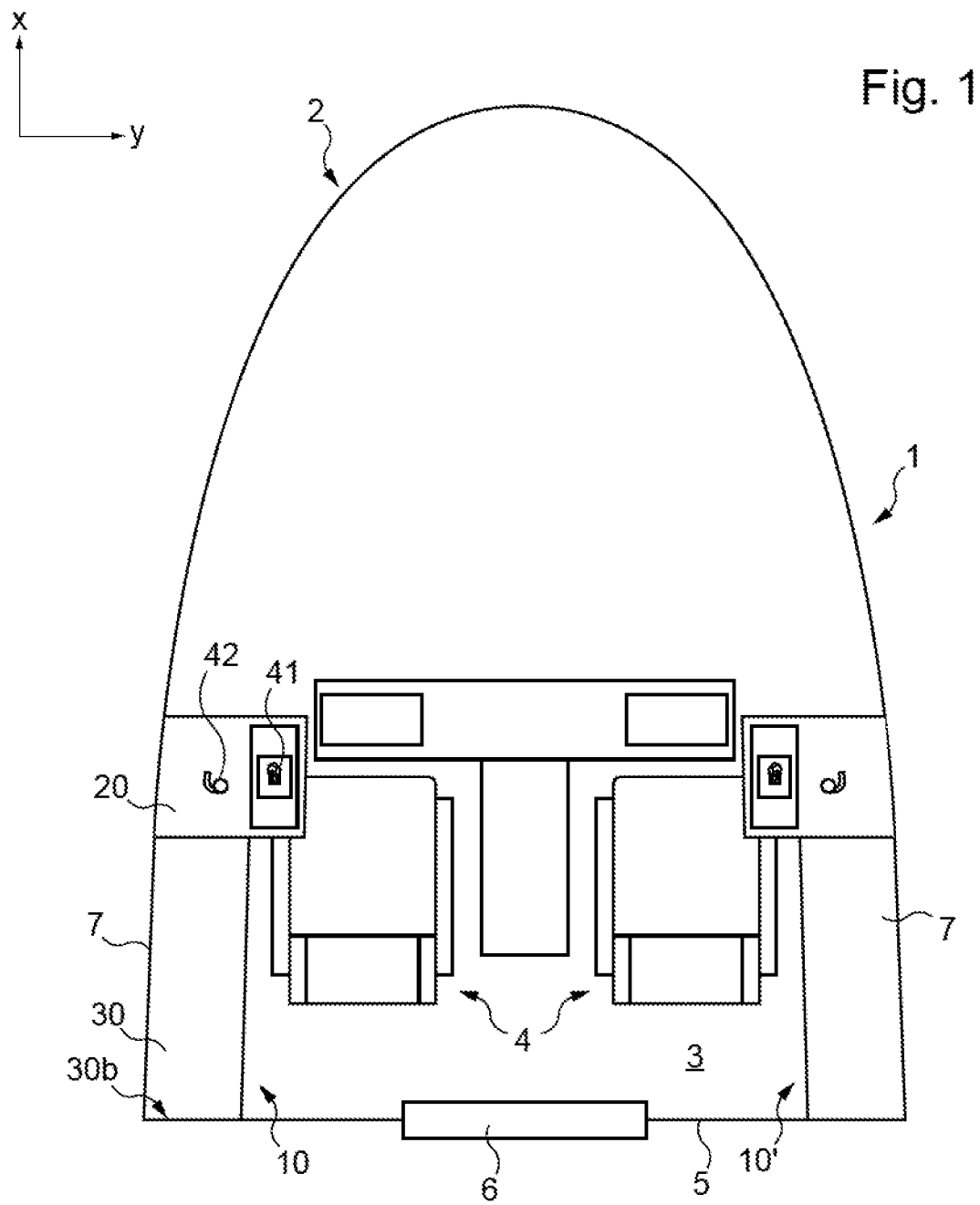
FIG. 1 is a schematic plan view of an aircraft cockpit according to one embodiment of the invention.

An example of an aircraft cockpit comprising at least one side console will be described first of all with reference to FIG. 1.

The aircraft cockpit or flight deck is positioned in a nose 1 of the aircraft. The cockpit is mounted within a primary fuselage structure 2, above a floor 3 which, in the heightwise direction, divides the internal volume of the fuselage primary structure 1 into a lower space, or hold, and an upper space housing the cockpit module.

A cockpit module notably comprises two control stations 4, left and right, for a pilot and a co-pilot respectively.

The nose 1 is delimited by a rear bulkhead 5 isolating the cockpit from the rest of the cabin of the aircraft. Conventionally, an access door 6 provides communication between the cockpit and the rest of the cabin of the aircraft.

The various elements described hereinabove in conjunction with the aircraft cockpit need not be described in further detail here in the context of the present invention.

The aircraft cockpit comprises in this embodiment two side consoles 10, 10', each extending along a lateral wall 7 of the fuselage primary structure 2 of the nose 1 of the aircraft.

Thus, when considering the longitudinal direction X of the aircraft, each side console 10, 10' extends substantially widthwise in the longitudinal direction X of the aircraft.

Each side console 10, 10' is positioned near one of the control stations 4 and is thus directly accessible to the pilot or to the co-pilot.

It may be noted that the two side consoles 10, 10' may offer the same functionalities. They may be symmetric and arranged symmetrically with respect to a vertical plane extending along the central longitudinal axis of the aircraft.

One example of a side console 10 with which the aircraft cockpit may be equipped will now be described with reference to FIGS. 2 to 6.

Figure 2:
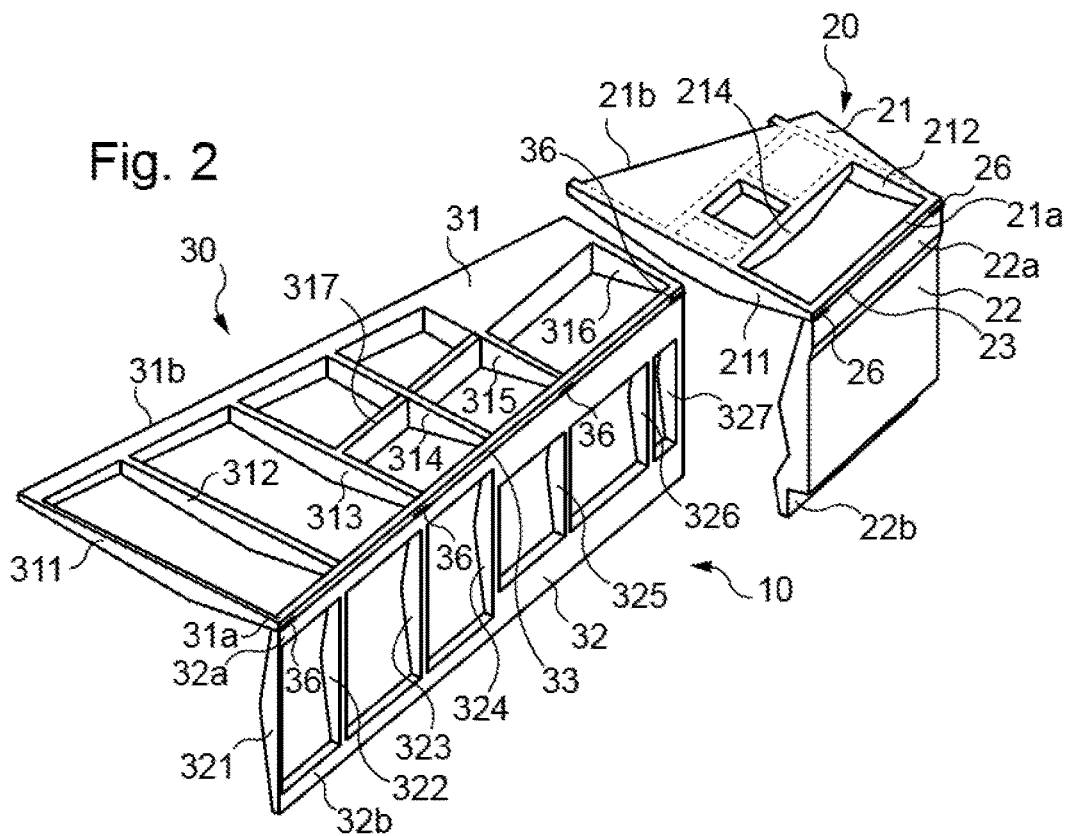
FIGS. 2 and 3 are perspective views, from the outside and from the inside, of single-piece components that form a side console according to one embodiment of the invention.
Figure 3:
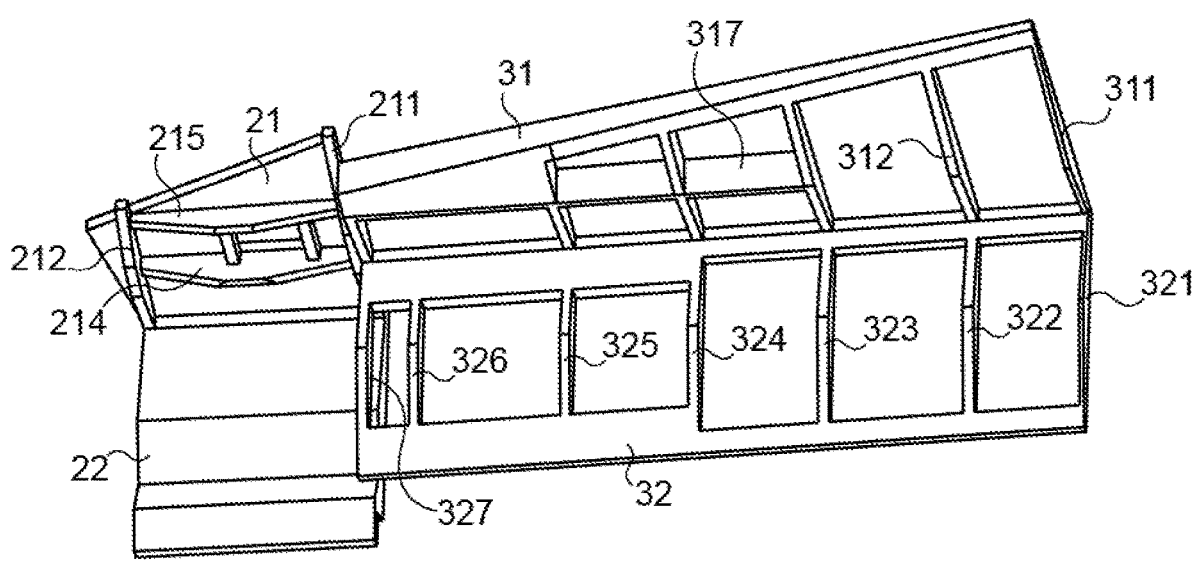

With reference to FIGS. 2 and 3, a side console 10 in this embodiment comprises a structure 20 for mounting of at least one item of aircraft equipment and a complementary structure 30 for the storage and stowage of various items.

Such a side console 10 makes it possible to offer a significant storage and stowage volume on each side of the cockpit. However, the present invention is not restricted to such a structure of side console; in particular, the side console could comprise only a structure 20 for mounting of an item of aircraft equipment.

The mounting structure 20 is formed of a first single-piece component 21 and of a second single-piece component 22 which are articulated relative to one another about a common axis of articulation 23 of the mounting structure 20.

Similarly, the complementary structure 30 is formed of a third single-piece component 31 and of a fourth single-piece component 32, articulated relative to one another about a common axis of articulation 33 of the complementary structure 30.

The mounting structure 20 thus has a storage or transport position, in which the first and second single-piece components 21, 22 are more or less folded against one another.

Likewise, the complementary structure 30 has a storage or transport position in which the third and fourth single-piece components 31, 32 are more or less folded against one another.

The articulation of the first and second single-piece components 21, 22 on the one hand, and of the third and fourth single-piece components 31, 32 on the other, may be achieved by known means of articulation such as hinges.

In the folded position (not illustrated in the figures), the first and second single-piece components 21, 22 extend respectively in two substantially mutually parallel planes.

Likewise, the third and fourth single-piece components 31, 32 extend respectively in two substantially mutually parallel planes.

Such a storage position for the side console 10 makes it easier to transport. Incorporating it into the cockpit can also be performed at the end of the process, since the side console 10 can be introduced into the zone that is to be fitted out via the door 6 used to access the aircraft cockpit.

As is clearly illustrated in FIGS. 2 and 3, in the position of installation the first and second single-piece components extend respectively in two substantially mutually perpendicular planes and the third and fourth single-piece components 31, 32 extend respectively in two substantially mutually perpendicular planes.

The first single-piece component 21 and the second single-piece component 22 each comprise a first edge 21a, 22a extending along the common axis of articulation 23 of the mounting structure 20.

The first edges 21a, 22a are fixed relative to one another by hinges 26 thus allowing a relative pivoting of the first and second single-piece components 21, 22 through an angle comprised between 0 and 90°.

Likewise, the third single-piece component 31 and the fourth single-piece component 32 each comprise a first edge 31a, 32a extending along the common axis of articulation 33 of the complementary structure 30.

The first edges 31a, 32a are fixed to one another by hinges 36 allowing a relative pivoting movement of the third and fourth single-piece components 31, 32 through an angle comprised between 0 and 90°.

Each first, second, third and fourth single-piece component 21, 22, 31, 32 comprises, on a second edge 21b, 22b, 31b, 32b, opposite to the first edge 21a, 22a, 31a, 32a, means of attachment by articulated connection.

Figure 6:
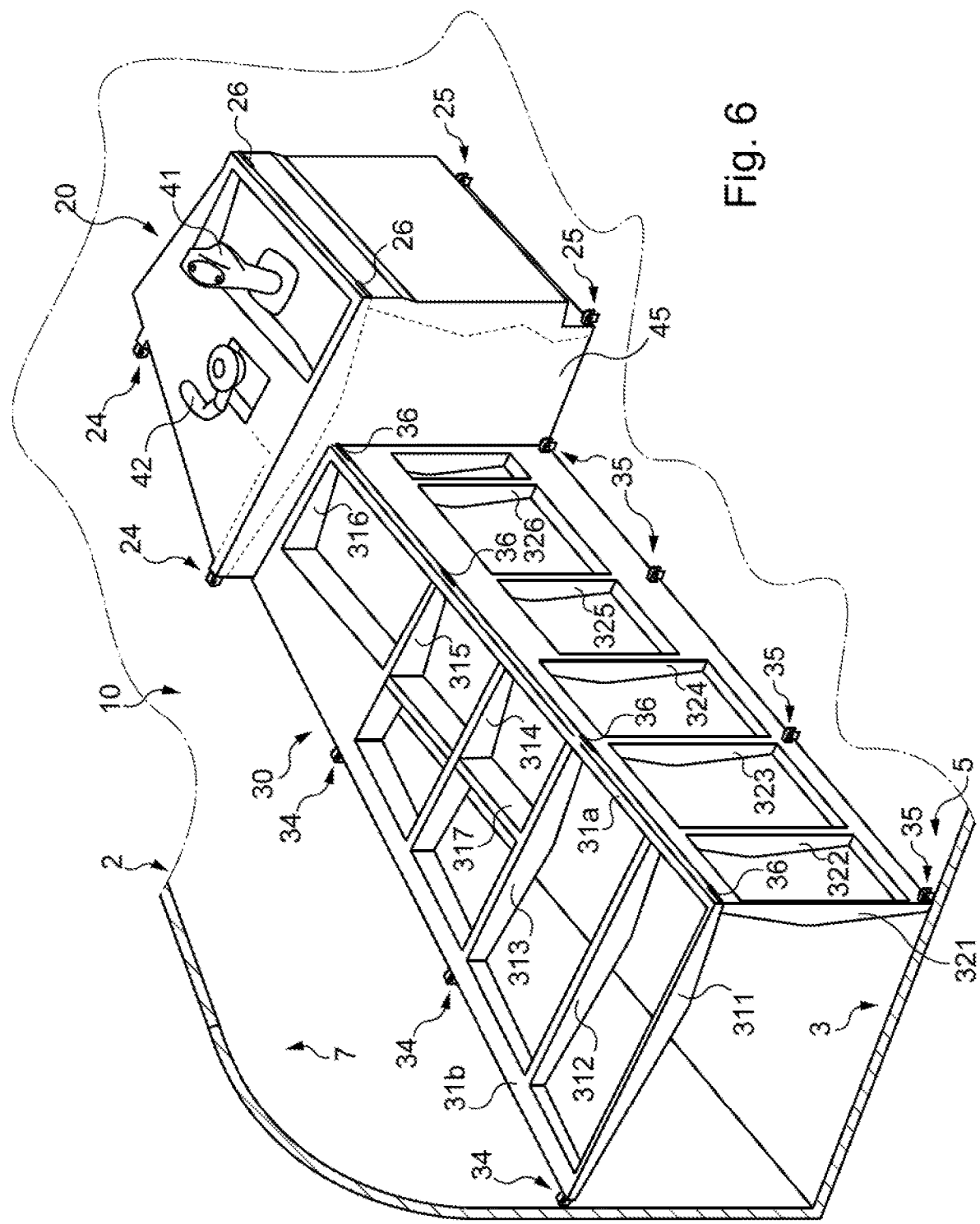
FIG. 6 is a schematic perspective view illustrating the mounting of a side console in an aircraft cockpit according to one embodiment.

As illustrated in FIG. 6, the means of attachment by articulated connection (indicated schematically by articulation points 24, 25, 34, 35) allow an articulated mounting of the mounting structure 20 and of the complementary structure 30 in its environment, within the aircraft cockpit.

On the side of the fuselage lateral wall 7 of the nose 1 of the aircraft, each articulated connection for attaching the first and third single-piece components 21, 31 is produced at the level of a frame of the fuselage primary structure 2.

Moreover, the articulated connection is made at the level of the cockpit floor 3 for fixing the second and fourth single-piece components 22, 32.

The means of fixing by articulated connection 24, 25, 34, 35 may be produced for example by means of a pivot connection and, for example, by means of a yoke engaging with a rod-end spherical bearing.

In the embodiment illustrated in FIG. 6, each articulated connection is made from a yoke fixed to the floor 3 or the fuselage lateral wall 7 and collaborates with a rod-end spherical bearing fixed to each component 21, 22, 31, 32 of the side console 10.

The side console 10 thus forms, with the floor 3 and the fuselage lateral wall 7, a parallelogram structure that is deformable because of the hinges 26, 36 connecting the single-piece components 21, 22, 31, 32 and because of the means of attachment by articulated connection 24, 25, 34, 35.

In the installed position, the first single-piece component 21 extends substantially in a horizontal plane, parallel to the floor 3 of the cockpit and the second single-piece component 22 extends substantially in a vertical plane, perpendicular to the floor 3 of the cockpit.

In the installed position, the third single-piece component 31 extends substantially in a horizontal plane, parallel to the floor 3 of the cockpit and the fourth single-piece component 32 extends substantially in a vertical plane, perpendicular to the floor 3 of the cockpit.

Installing the mounting structure 20 and the complementary structure 30 by means of articulated connections, and articulating the single-piece components 21, 22, 31, 32 with respect to one another makes it possible to achieve a statically determinant mounting of the side console 10 in an aircraft cockpit. The side console 10 is able to follow the deformations of the aircraft, notably the deformations of the fuselage primary structure 2 during the various aircraft cabin pressurization cycles.

The mounting structure 20 of a side console 10 will now be described in greater detail with reference to FIGS. 4 and 5.

Figure 5:
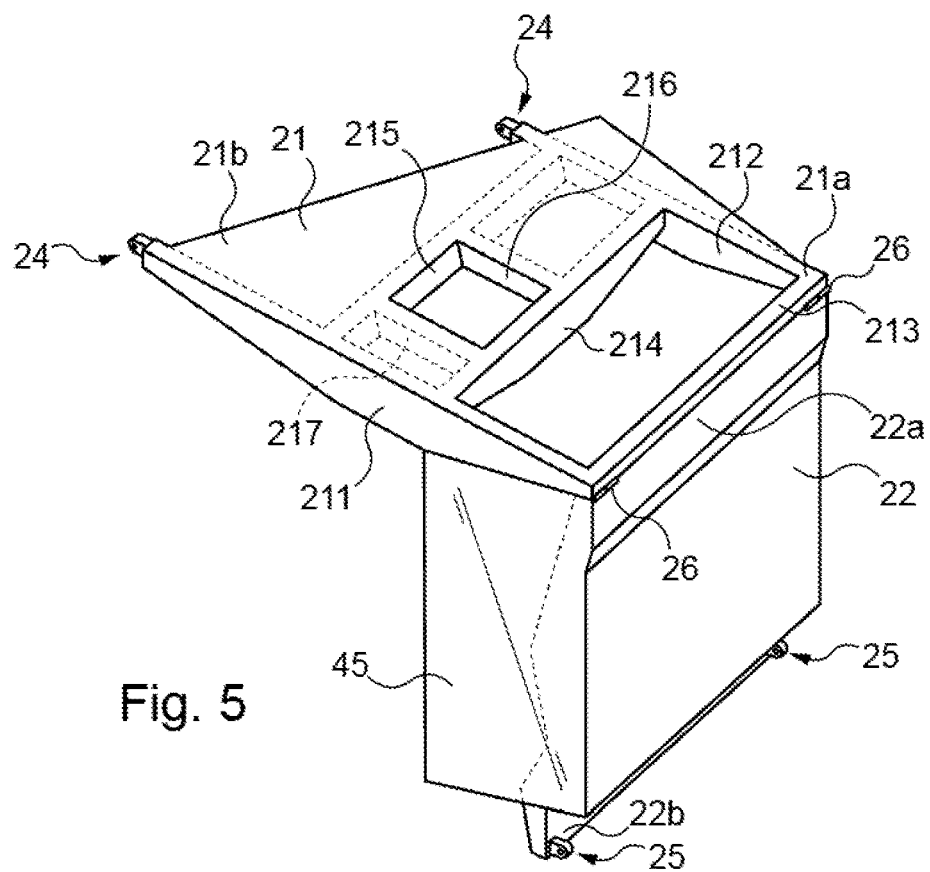
FIG. 5 is a schematic perspective view of the mounting structure of FIG. 4.

As is clearly illustrated in FIG. 5, the first single-piece component 21 comprises rigid ribs 211-217.

The rigid ribs 211-217 provide reinforcement for the first single-piece component 21 in various directions so that it can withstand and react the loads applied to the mounting structure 20.

In particular, the first single-piece component 21 comprises two transverse ribs 211, 210 extending along the transverse sides of the first single-piece component 21, from the first edge 21a to the opposite second edge 21b.

Likewise, the first edge 21a of the first single-piece component 21 is formed of a rigid rib 213.

For preference, the means of attachment by articulated connection 24 and the hinges 26 for mounting of the first single-piece component 21 on the second single-piece component 22 are secured to the rigid ribs 211, 212, 213 and arranged more or less at the four corners of the first single-piece component 21.

The first single-piece component 21 further comprises two further longitudinal rigid ribs 214, 215, substantially parallel to the rigid rib 213 of the first edge 21a.

The two longitudinal rigid ribs 214, 215 thus extend between the two transverse grooves 211, 212.

The rigid rib 213 of the first edge 21a and a first rib 214 of the two longitudinal rigid ribs 214, 215 form, with the transverse ribs 211, 212, a first frame for support of an item of aircraft equipment.

Moreover, the first single-piece component 21 comprises two complementary transverse rigid ribs 216, 217, extending between the two longitudinal rigid ribs 214, 215 and forming a second frame for support of an item of aircraft equipment.

Figure 4:
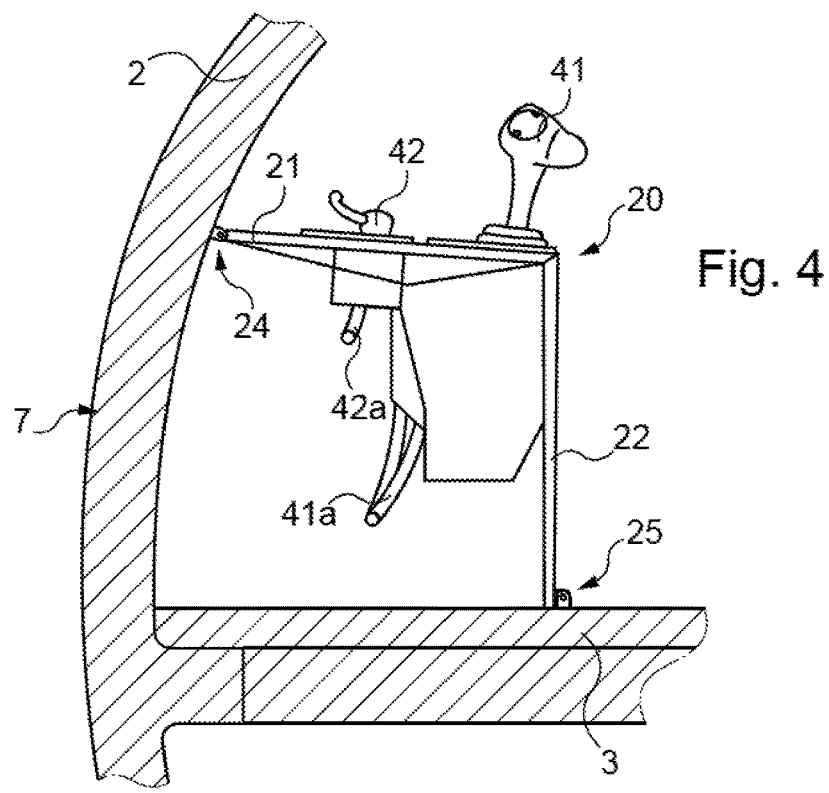
FIG. 4 is a schematic side view illustrating the installation of a structure for mounting of a side console in an aircraft cockpit according to one embodiment.

As is clearly illustrated in FIG. 4, the first support frame is designed here to support an aircraft flight control 41, for example a ministick (or joystick) 41 allowing control over the rolling of the aircraft.

The second support frame is designed for example to support a second flight control 42, such as a nosewheel steering (NWS) device designed to steer the aircraft on the ground, during parking maneuvers.

Because of the rigid ribs that form the first and second support frames, the mounting of the flight controls 41, 42 exhibits good rigidity which means that the mechanical stress loadings applied to flight controls such as the ministick 41 or the nosewheel steering device 42 are reacted satisfactorily by the mounting structure 20.

Furthermore, this rigid mounting makes it possible to offer the pilot or co-pilot sufficiently precise control.

The second single-piece component 22 is also formed of a reinforced structure, allowing adequate reaction of the loadings applied to the first single-piece component 21 when the flight controls 41, 42 are operated.

To this end, the second single-piece component 22 comprises a section of greater thickness in a central zone in comparison with its thickness at the first edge 22a and at the opposite second edge 22b.

The mounting structure 20 thus formed of the first and second single-piece components has a reinforced structure, forming a chassis for mounting an item of aircraft equipment.

The mounting structure 20 is particularly well suited to the mounting of the flight controls 41, 42 which may thus be accessible to the pilot or the co-pilot when he is in his control station, near the side console.

Of course, the examples of aircraft equipment given hereinabove do not in any way limit the type of equipment that can be built into the mounting structure 20.

Such aircraft equipment may for example be a safety device such as an oxygen mask, or even a display and/or control screen used by the pilot or the co-pilot.

The third and fourth single-piece components 31, 32 of the complementary structure 30 also comprise several rigid ribs 311-317, 321-327.

In general, the rigid ribs 311-317, 321-327 define various housings for storing objects in the complementary structure 30 of the side console 10.

More particularly, the third and fourth single-piece components 31, 32 comprise transverse rigid ribs 311-316, 321-327, able, between them and with the first and second edges 31a, 32a, 31b, 32b, to define frames for accommodating or housing various items or items storage boxes.

In the embodiment illustrated, the third single-piece component 31 further comprises a longitudinal rigid rib 317 extending between transverse rigid ribs 313, 314, 315, making it possible to define accommodating or housing frames of smaller size.

By way of nonlimiting example, the objects housed in the complementary structure 30 may be safety items needed by the pilot and, for example, an oxygen mask, smoke goggles, fire-resistant gloves or a lamp of the torch lamp type.

The objects stored in the complementary structure 30 may also be personal items such as a portable computer, a cup, spectacles, etc.

The mounting of a storage box 70 in a receiving frame 71 defined by rigid transverse ribs 311, 312 and the first and second edges 31a, 31b of the third single-piece component 31 of the complementary structure 30 has been illustrated for example in FIGS. 7A and 7B.

The storage box 70 may thus have an external shape corresponding more or less to the contours of the receiving frame 71.

In this embodiment, and nonlimitingly, the storage box 70 has a peripheral rim 73 with fixing holes 72 in the four corners.

Each fixing hole 72 may thus accept a fixing designed to collaborate with an insert arranged respectively at the four corners of the receiving frame 71 in the third single-piece component 31.

Any type of fixing may be used, and for example a quarter-turn fixing.

The storage box 70 may thus be used to store various safety items or personal items as indicated hereinabove.

As clearly illustrated in FIG. 7B, the storage box 70 extends under the third single-piece component 31 inside the complementary structure 30.

Of course, this type of mounting of the storage box 70 is nonlimiting.

Thus, in another example illustrated in FIG. 7C, a second storage box 80 may be mounted in a receiving frame 81 defined by rigid transverse ribs 322, 323 of the first and second edges 32a, 32b of the fourth single-piece component 32 of the complementary structure 30.

In this embodiment, the storage box 80 is mounted to pivot about a pivot axis 82.

Nonlimitingly, the pivot axis 82 may be fixed by clip-fastening in the lower part of the receiving frame 81.

The storage box 80 may thus be kept in a retracted position, inside the receiving frame 81, by magnets (not depicted) arranged in the upper part of the receiving frame 81.

The storage box 80 may on its external face have a translucent window 83 so that its contents can be seen when it is in its retracted position.

Access to its contents can be had by pivoting the storage box 80 about the pivot axis 82, into a position extracted from the receiving frame 81 of the fourth single-piece component 32 of the complementary structure 30.

Such a storage box 80 thus, in the position retracted inside the complementary structure 30, extends partially under the third single-piece component 31. In this exemplary embodiment, an adjacent receiving frame 85 provided in the third single-piece component 31 is situated above the storage box 80 in the retracted position. The third single-piece component 31 may be provided with a panel or shallow tray (not depicted) closing off the adjacent receiving frame 85.

Of course, these examples in FIGS. 7A to 7C are purely illustrative and do not in any way limit the type of storage either in the horizontal plane of the side console 10, defined by the third single-piece component 31, or in the vertical plane of the side console 10 defined by the fourth single-piece component 32.

In particular, the receiving frames or the housings described hereinabove form different stowage recesses or storage binnacles accessible both from the upper surface and from the vertical surface of the side console 10.

As can be seen clearly in FIGS. 2, 3 and 5, the rigid ribs 211-217 of the first single-piece component 21 and the rigid ribs 311-317, 321-327 of the third and fourth single-piece components 31, 32 are produced from rectilinear structures of which the cross section or thickness is greater in the middle than at the ends so as to improve the ability to react forces applied to the ends of the rigid ribs 211-217, 311-317, 321-327.

In this respect, the means of attachment by articulated connection 24, 25, 34, 35 are preferably arranged at the ends of transverse rigid ribs 211, 212, 311, 313, 315, 316, 321, 323, 325, 327 of the single-piece components 21, 31, 32.

The single-piece components 21, 22, 31, 32 may be produced for example in a composite material with reinforcing elements made of carbon in order to produce the rigid ribs 211-217, 312-317, 321-327.

By way of nonlimiting example, the reinforcers are produced from a dry woven matrix of carbon fibre (or glass fibre) and introduced into a mould.

A resin, for example of the epoxy resin type, is injected at low pressure into the mould.

For preference, the method implements a known technique of vacuum infusion moulding whereby resin is injected under vacuum into male and female moulds.

In order also to give the single-piece components 21, 22, 31, 32 of the side console 10 a decorative function, it is possible to contemplate applying a finish directly at the time that each single-piece component made of composite material is produced.

The final layer or final ply produced makes it possible for example to obtain a carbon finish.

It is also possible to paint or to supply additional foam, completely or partially, to each single-piece component, notably in regions liable to sustain impact.

The application of foam may be performed using known techniques of overinjection or expansion, directly on the composite material component.

Moreover, it will be noted that the technique of manufacturing each single-piece component 21, 22, 31, 32 of composite material allows various inserts to be incorporated at the time of injecting the resin, which inserts can be of use for example for securing items or boxes intended to be housed in the various housings of the side console 10.

As is clearly illustrated in FIG. 6, in the position of installation, the mounting structure 20 and the complementary structure 30 extend in the continuation of one another in the longitudinal direction X, substantially parallel to the common axis of articulation 23 of the mounting structure 20 and the common axis of articulation 33 of the complementary structure 30.

Such a side console 10 allows the cockpit to be fitted out lengthways along the lateral wall 7 of the fuselage.

As is clearly illustrated in FIG. 1, such a side console 10 may thus extend in the longitudinal direction X of the aircraft from a point situated at the front of the cockpit, near the control stations 4, as far as the rear bulkhead 5 delimiting the aircraft cockpit space.

In order to maintain the greatest possible amount of space for moving around in the cockpit, and notably for accessing the control stations 4, the complementary structure 30 in this embodiment has a width in the transverse direction Y of the aircraft that is less than the width of the mounting structure 20 of the side console 10.

When the mounting structure 20 and the complementary structure 30 are arranged in the continuation of one another, a blanking panel 45 is provided to blank off the open space defined by the first single-piece component 21 and the second single-piece component 22 of the mounting structure 20, beyond the complementary structure 30.

The complementary structure 30 thus extends from the blanking panel 45 as far as a rear end 30b intended to come more or less into contact with the rear bulkhead 5 of the cockpit.

As is clearly visible in FIGS. 4 and 6, the mounting structure 20 defines with the lateral wall 7 of the fuselage primary structure 2 and the floor 3 of the cockpit a free volume suited to the routing of an electrical circuit for powering and/or controlling the aircraft.

As is clearly illustrated in FIG. 4, the flight controls 41, 42 of the aircraft may be connected directly by connectors 41a, 42a to the main aircraft electrical power and control network, without requiring intermediate routing systems and/or breaker plates or additional connection fittings.

The wiring of the flight controls 41, 42 thus becomes easier because of the free volume there is between the mounting structure 20, the lateral wall 7 of the fuselage primary structure 2 and the floor 3 of the cockpit.

As will be appreciated from FIG. 6, the route followed by the electric power and/or control circuit extending under the mounting structure 20 may extend into a free volume defined by the complementary structure 30, the lateral wall 7 of the fuselage primary structure 2 and the floor 3 of the cockpit.

Moreover, it is also possible to consider routing pipes carrying air or oxygen directly, notably for connecting an oxygen mask, provided as in this example in the complementary structure 30 or, alternatively, in the mounting structure 20 of the side console 10.

Thanks to the free space under each mounting structure 20 and complementary structure 30 of the side console 10, a space is obtained that extends in the longitudinal direction X of the aircraft so that various electrical or hydraulics supply systems can be routed and ducted therethrough.

Moreover, it is possible to connect the electrical network of the aircraft directly to the various items of equipment or flight controls housed in the side console 10, without the need to run internal intermediate networks or use intermediate connectors.

The side console 10 is thus produced chiefly from four single-piece components 21, 22, 31, 32, able to perform the multiple functions of:
  acting as a chassis for mounting equipment, such as flight controls 41, 42,
  acting as a secondary structure for housing and storing various items,
  being decorative, the side console 10 being visible and needing to meet impact resistance and trim requirements.

There is thus obtained a side console 10 that is quick to mount on each side of an aircraft cockpit. Mounting can be performed at the end of cockpit installation, leaving the sides of the aircraft nose 1 accessible.

Such a mounting is compatible with the current demands of a modular assembly of an aircraft nose and rapid equipment integration.

In particular, when seeking to integrate a floor module into the nose of the aircraft, which already bears a certain number of cockpit facilities and equipment items, it is important to provide good accessibility along the lateral walls of the fuselage of the nose of the aircraft.

Of course, the present invention is not restricted to the exemplary embodiments described hereinabove.

In particular, the means of articulation or hinges 26 between the first single-piece component 21 and the second single-piece component 22 may be detachable so that the first and second single-piece components 21, 22 can be transported and introduced separately into the cockpit. They are fixed together along the common axis of articulation 23 of the mounting structure 20 directly in the aircraft cockpit.

Likewise, the means of articulation or hinges 36 between the third single-piece component 31 and the fourth single-piece component 32 may be detachable so that the third single-piece component 31 and the fourth single-piece component 32 can be transported and introduced separately into the cockpit. They are fixed together along the common axis of articulation 33 of the complementary structure 30 upon installation of the complementary structure 30 in the aircraft cockpit.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cockpit comprising:
   at least one side console extending along a fuselage lateral wall of the a nose of the aircraft, said side console comprising:
      a mounting structure for at least one item of aircraft equipment, said mounting structure formed of a first single-piece component and of a second single-piece component which are configured to articulate relative to one another about a common axis of articulation, said first and second single-piece components configured to extend respectively in two substantially mutually perpendicular planes in an installed position along said fuselage lateral wall,
      wherein said first single-piece component comprises means of attachment by articulated connection to a frame of the fuselage lateral wall of said aircraft, and said second single-piece component comprises means of attachment by articulated connection to a floor of said cockpit.

2. The aircraft cockpit according to claim 1, wherein said first single-piece component comprises rigid ribs forming a support frame for at least one item of aircraft equipment comprising an aircraft flight control including at least one of a ministick configured to control the rolling of the aircraft and a device for steering an aircraft nosewheel.

3. The aircraft cockpit according to claim 1, wherein said mounting structure defines, with said lateral wall of the fuselage and the floor of the cockpit, a free volume suited to at least one of:
   a routing of an electrical circuit for powering and/or controlling said at least one item of aircraft equipment and a routing of a pipe carrying air or oxygen.

4. The aircraft cockpit according to claim 1, wherein said side console comprises a complementary structure formed of a third single-piece component and of a fourth single-piece component which are configured to articulated with respect to one another about a common axis of articulation of said complementary structure, said third and fourth single-piece components configured to extendi respectively in two substantially mutually perpendicular planes in an installed position along said lateral wall of the fuselage.

5. The aircraft cockpit according to claim 4, wherein said third single-piece component comprises means of attachment by articulated connection to a frame of the fuselage lateral wall of said aircraft, and said fourth single-piece component comprises means of attachment by articulated connection to the cockpit floor.

6. The aircraft cockpit according to claim 4, wherein said mounting structure and said complementary structure extend in the continuation of one another in the longitudinal direction of the nose of the aircraft.

7. The aircraft cockpit according to claim 4, wherein said third and fourth single-piece components comprise rigid ribs defining various housings for the storage of objects including at least one of an oxygen mask, smoke goggles, fire-resistance gloves or a lamp.

8. The aircraft cockpit according to claim 4, wherein said complementary structure defines, with said lateral wall of the fuselage and a floor of the cockpit, a free volume suited to at least one of:
   a routing of an electrical circuit for powering and/or controlling said at least one item of equipment of said mounting structure and
   a routing of a pipe carrying air or oxygen.

* * * * *